United States Patent
Sugihara et al.

(10) Patent No.: US 11,289,277 B2
(45) Date of Patent: Mar. 29, 2022

(54) LITHIUM ION CAPACITOR POSITIVE ELECTRODE

(71) Applicant: TAYCA CORPORATION, Osaka (JP)

(72) Inventors: Ryosuke Sugihara, Osaka (JP); Keiichi Watanabe, Osaka (JP)

(73) Assignee: TAYCA CORPORATION, Osaka (JP)

( * ) Notice: Subject to any disclaimer, the term of this patent is extended or adjusted under 35 U.S.C. 154(b) by 305 days.

(21) Appl. No.: 16/609,020

(22) PCT Filed: Apr. 27, 2018

(86) PCT No.: PCT/JP2018/017164
§ 371 (c)(1),
(2) Date: Oct. 28, 2019

(87) PCT Pub. No.: WO2018/203518
PCT Pub. Date: Nov. 8, 2018

(65) Prior Publication Data
US 2020/0143996 A1 May 7, 2020

(30) Foreign Application Priority Data
May 1, 2017 (JP) .............................. JP2017-091449

(51) Int. Cl.
*H01G 11/06* (2013.01)
*C01G 23/00* (2006.01)
(Continued)

(52) U.S. Cl.
CPC ........... *H01G 11/06* (2013.01); *C01G 23/005* (2013.01); *H01G 11/46* (2013.01); *H01G 11/50* (2013.01); *C01P 2006/40* (2013.01)

(58) Field of Classification Search
CPC ................................. H01G 11/06; H01G 11/46
See application file for complete search history.

(56) References Cited

U.S. PATENT DOCUMENTS

2004/0202934 A1* 10/2004 Zaghib .................. H01M 4/623
429/231.1
2005/0042450 A1* 2/2005 Sano ...................... H01G 11/28
428/375
(Continued)

FOREIGN PATENT DOCUMENTS

JP 2003-297699 A 10/2003
JP 2009-106812 A 5/2009
(Continued)

OTHER PUBLICATIONS

International Search Report dated Jul. 17, 2018, issued in counterpart International Application No. PCT/JP2018/017164 (1 page).

*Primary Examiner* — Eric W Thomas
(74) *Attorney, Agent, or Firm* — Westerman, Hattori, Daniels & Adrian, LLP

(57) ABSTRACT

There is demand for a lithium ion capacitor positive electrode that can improve the battery characteristics (and, in particular, the rate characteristics) of a lithium ion capacitor. This lithium ion capacitor positive electrode is characterized by containing, in a positive electrode active material, at least one titanate selected from among $Li_2TiO_3$, $Li_4Ti_5O_{12}$, $Na_2TiO_3$, and $K_2Ti_2O_5$.

4 Claims, 1 Drawing Sheet

(51) Int. Cl.
 *H01G 11/46* (2013.01)
 *H01G 11/50* (2013.01)

(56) References Cited

U.S. PATENT DOCUMENTS

| | | | | |
|---|---|---|---|---|
| 2012/0050949 | A1* | 3/2012 | Kim | H01G 11/24 |
| | | | | 361/505 |
| 2012/0077080 | A1* | 3/2012 | Liu | H01G 11/06 |
| | | | | 429/206 |
| 2014/0293507 | A1* | 10/2014 | Gadkaree | H01G 9/0029 |
| | | | | 361/502 |
| 2015/0243449 | A1 | 8/2015 | Okada et al. | |

FOREIGN PATENT DOCUMENTS

| | | |
|---|---|---|
| JP | 5505546 B2 | 5/2014 |
| JP | 5650029 B2 | 1/2015 |
| JP | 2016-197647 A | 11/2016 |
| JP | 2016-197648 A | 11/2016 |
| JP | 2016-197649 A | 11/2016 |
| JP | 6029675 B2 | 11/2016 |

\* cited by examiner

LITHIUM ION CAPACITOR POSITIVE ELECTRODE

TECHNICAL FIELD

The present invention relates to a lithium ion capacitor among power storage devices and specifically to a positive electrode among members constituting the lithium ion capacitor. More specifically, the present invention relates to a positive electrode of lithium ion capacitors whose capacitor characteristics (in particular, rate characteristics) can be improved by incorporating at least one titanate selected from $Li_2TiO_3$, $Li_4Ti_5O_{12}$, $Na_2TiO_3$, and $K_2Ti_2O_5$, though the titanate itself has no electrical conductivity.

BACKGROUND ART

In recent years, the development of lithium ion capacitors having both high-output and long-life characteristics of electric double layer capacitors and high-energy characteristics of lithium ion batteries has been facilitated, and various applications have been made (PTL 1 to PTL 3).

Electric double layer capacitors are power storage devices that perform charge and discharge using a phenomenon in which ion components in an electrolyte adsorb to and desorb from an electrode interface and thus can be regarded as rapid charge/discharge power storage devices in terms of their mechanism. On the other hand, lithium ion capacitors use the essence of lithium ion batteries (specifically, charge and discharge caused by using an oxidation-reduction reaction) and thus have poorer rapid charge/discharge characteristics than electric double layer capacitors, which requires measures against rapid charge/discharge characteristics (in particular, rate characteristics) as in the case of lithium ion batteries.

In the related art, the rapid charge/discharge characteristics (in particular, rate characteristics) of lithium ion capacitors are generally improved by decreasing the particle size or increasing the specific surface area of a material for negative electrodes.

CITATION LIST

Patent Literature

PTL 1: Japanese Patent No. 5505546
PTL 2: Japanese Patent No. 5650029
PTL 3: Japanese Patent No. 6029675
PTL 4: Japanese Unexamined Patent Application Publication No. 2016-197647
PTL 5: Japanese Unexamined Patent Application Publication No. 2016-197648
PTL 6: Japanese Unexamined Patent Application Publication No. 2016-197649

SUMMARY OF INVENTION

Technical Problem

As a result of thorough studies conducted by the present inventors, they have found that when the positive electrode of a lithium ion capacitor contains a particular titanate, the rate characteristics of the lithium ion capacitor can be improved.

Hitherto, it has been a common general technical knowledge that the addition of an additive that has no electrical conductivity and does not contribute to storage of electricity to the positive electrode of a lithium ion capacitor deteriorates the capacitor characteristics. Therefore, this finding overturns the common general technical knowledge in the related art.

That is, since lithium ion capacitors have a mechanism in which anions in an electrolyte adsorb to a positive electrode, a material having a large specific surface area and a high electrical conductivity is, in theory, preferably used for the positive electrode to improve the capacitor characteristics. However, activated carbon used for positive electrodes basically has a smaller capacity than battery active materials. Thus, if an additive that does not contribute to storage of electricity is added to such a positive electrode, the capacity is undesirably further decreased. If acetylene black or the like is added in order to impart electrical conductivity, the rate characteristics are improved, but the specific surface area is decreased, which eventually decreases the capacity.

Under such circumstances, it has been a common general technical knowledge in the related art that acetylene black serving as a conductive aid needs to be added because of low electrical conductivity of activated carbon even if the capacity is decreased. In the present invention, a particular titanate is used and the rate characteristics can be improved despite the fact that the titanate has no electrical conductivity. Therefore, the present invention overturns the common general technical knowledge in the related art.

PTL 4 to PTL 6 disclose that a lithium compound is used for a power storage device. However, such applications are only made to capture protons generated in the power storage device, which is a technical idea different from that in the present invention in which a titanate is used as a material for positive electrodes to improve the rate characteristics of the lithium ion capacitor.

Solution to Problem

To achieve the above object, a lithium ion capacitor positive electrode according to the present invention contains, in a positive electrode active material, at least one titanate selected from $Li_2TiO_3$, $Li_4Ti_5O_{12}$, $Na_2TiO_3$, and $K_2Ti_2O_5$.

In the lithium ion capacitor positive electrode according to the present invention, a content of the titanate is 0.5 to 50 wt % relative to the positive electrode active material.

(Basic Structure)

The lithium ion capacitor positive electrode according to the present invention has a basic structure in which at least one particular titanate selected from $Li_2TiO_3$, $Li_4Ti_5O_{12}$, $Na_2TiO_3$, and $K_2Ti_2O_5$ is contained in a positive electrode active material. In the present invention, the rate characteristics of a lithium ion capacitor can be improved by incorporating, into a positive electrode of the lithium ion capacitor, an additive (particular titanate) that has no electrical conductivity and does not contribute to storage of electricity, which has been put under a taboo in lithium ion capacitors in the related art. Furthermore, the rate characteristics can be improved despite the fact that the titanate itself has no electrical conductivity.

Although the mechanism in which the rapid charge/discharge characteristics are improved despite the fact that the titanate itself has no electrical conductivity is unclear, it is believed that the ionic mobility in a positive electrode or at an interface between a positive electrode and an electrolyte is improved by adding the titanate.

(Lithium Titanate)

The lithium titanate used for the lithium ion capacitor positive electrode according to the present invention needs to contain a component having a composition of $Li_2TiO_3$ or $Li_4Ti_5O_{12}$ as a main component.

Herein, lithium titanate is generally produced (synthesized) by mixing and then firing a Li source and a Ti source serving as raw materials. Therefore, in addition to $Li_2TiO_3$ and $Li_4Ti_5O_{12}$, lithium titanates having a ramsdellite structure ($LiTi_2O_4$: 124 type, $Li_2Ti_3O_7$: 237 type) are also synthesized.

Accordingly, the phrase "contained as a main component" in the present invention means that even if lithium titanates having various structures are contained as described above, a lithium titanate having a composition of $Li_2TiO_3$ or $Li_4Ti_5O_{12}$ is contained as a main component. Specifically, the content of the lithium titanate having a composition of $Li_2TiO_3$ or $Li_4Ti_5O_{12}$ is preferably 70% or more, more preferably 90% or more, and most preferably 95% or more.

(Sodium Titanate)

The sodium titanate used for the lithium ion capacitor positive electrode according to the present invention needs to contain $Na_2TiO_3$ as a main component.

Sodium titanates having various structures are also synthesized as in the case of lithium titanates. Therefore, the phrase "contained as a main component" means that even if sodium titanates having various structures are contained, a sodium titanate having a composition of $Na_2TiO_3$ is contained as a main component. Specifically, the content of the sodium titanate having a composition of $Na_2TiO_3$ is preferably 70% or more, more preferably 90% or more, and most preferably 95% or more.

(Potassium Titanate)

The potassium titanate used for the lithium ion capacitor positive electrode according to the present invention needs to contain $K_2Ti_2O_5$ as a main component.

Potassium titanates having various structures are also synthesized as in the case of lithium titanates. Therefore, the phrase "contained as a main component" means that even if potassium titanates having various structures are contained, a potassium titanate having a composition of $K_2Ti_2O_5$ is contained as a main component. Specifically, the content of the potassium titanate having a composition of $K_2Ti_2O_5$ is preferably 70% or more, more preferably 90% or more, and most preferably 95% or more.

(Content)

These titanates have an effect of improving the rate characteristics, that is, the rapid charge/discharge characteristics of lithium ion capacitors in proportion to the content of the titanates.

These titanates also have an effect of suppressing generation of gas in addition to the effect of improving the rapid charge/discharge characteristics. However, the optimum content range is present for the effect of suppressing generation of gas. If the titanates are excessively added, the amount of gas generated increases. Specifically, when the content of the titanates is 60 wt % relative to the positive electrode active material, 0.16 ml of gas is generated, which is an amount substantially equal to the amount (0.15 ml) in the case where the titanates are not contained.

Therefore, the upper limit of the content of the titanates is preferably less than 60 wt % to improve the rate characteristics and suppress generation of gas. The specific content of the titanates is preferably 0.5 to 50 wt %, more preferably 1 to 30 wt %, and further preferably 10 to 20 wt % relative to the positive electrode active material of the lithium ion capacitor.

Since titanates are not active materials, the electric capacity of a lithium ion capacitor is generally expected to be decreased when titanates are added to a positive electrode.

However, although the reason is unclear, the use of $Li_2TiO_3$ as a lithium titanate does not decrease the electric capacity as described later. Thus, from the viewpoints of improving the rapid charge/discharge characteristics (rate characteristics), suppressing generation of gas, and suppressing the decrease in electric capacity, $Li_2TiO_3$ is preferably used among the above titanates.

Advantageous Effects of Invention

According to the lithium ion capacitor positive electrode of the present invention, when the positive electrode of a lithium ion capacitor contains at least one titanate selected from $Li_2TiO_3$, $Li_4Ti_5O_{12}$, $Na_2TiO_3$, and $K_2Ti_2O_5$, the battery characteristics (in particular, rate characteristics) of the lithium ion capacitor can be improved despite the fact that the titanate itself has no electrical conductivity.

In either of a lithium ion capacitor containing $Li_4Ti_5O_{12}$ as a negative electrode active material or a lithium ion capacitor containing graphite as a negative electrode active material, when the above titanate is incorporated in the positive electrode, the battery characteristics (in particular, rate characteristics) can be improved.

Furthermore, a lithium ion capacitor obtained by combining the above positive electrode and a negative electrode containing $Li_4Ti_5O_{12}$ having a large specific surface area can achieve better battery characteristics. Herein, the specific surface area of the negative electrode active material is preferably 10 $m^2/g$ or more, more preferably 20 $m^2/g$ or more, and most preferably 50 $m^2/g$ or more.

According to the lithium ion capacitor positive electrode of the present invention, the above effects can be further improved by controlling the titanate content within the particular range.

DESCRIPTION OF EMBODIMENTS

Examples

Next, the lithium ion capacitor positive electrode according to the present invention will be described in detail based on Examples and Comparative Examples. The present invention is not limited to Examples below.

Example 1

(Production of Positive Electrode)

First, 300 g of an anatase titanium oxide (AMT-100 manufactured by TAYCA Corporation) and 266 g of lithium hydroxide (manufactured by FMC) were mixed with each other in a wet process. Then, the resulting mixture was fired in the air at 750° C. for 2 hours to obtain a 213-type lithium titanate ($Li_2TiO_3$).

Subsequently, 4.60 g of activated carbon (AP-20-0001 manufactured by AT Electrode Co., Ltd.) serving as a positive electrode active material, 0.54 g of acetylene black (DENKA BLACK manufactured by Denka Company Limited) serving as a conductive aid, and 0.025 g of the $Li_2TiO_3$ serving as an additive were added to 12.47 g of a 1.4 wt % aqueous solution of carboxymethyl cellulose (manufactured by DKS Co., Ltd.) serving as a thickener and dispersed using a dispersing machine. Furthermore, 1.37 g of styrene-butadiene rubber (manufactured by JSR Corporation) serving as a binding agent was added thereto and mixed using a dispersing machine. The resulting mixture (coating material) was applied onto an etched aluminum foil (manufactured by JAPAN CAPACITOR INDUSTRIAL Co., Ltd.) serving as a current collector and dried to produce a lithium ion capacitor positive electrode in Example 1 that contained $Li_2TiO_3$. The content of $Li_2TiO_3$ relative to the positive electrode active material (activated carbon) was 0.5 wt %.

(Production of Negative Electrode)

First, 520 g of an orthotitanic acid (manufactured by TAYCA Corporation) and 218 g of lithium hydroxide monohydrate (manufactured by FMC) were mixed with each other in a wet process. Then, the resulting mixture was fired in the air at 650° C. for 2 hours to obtain fine particles of $Li_4Ti_5O_{12}$ having a specific surface area of 70 $m^2/g$.

Subsequently, 4.62 g of the $Li_4Ti_5O_{12}$ serving as a negative electrode active material and 0.54 g of acetylene black (DENKA BLACK manufactured by Denka Company Limited) serving as a conductive aid were added to 12.47 g of a 1.4 wt % aqueous solution of carboxymethyl cellulose (manufactured by DKS Co., Ltd.) serving as a thickener and dispersed using a dispersing machine. Furthermore, 1.37 g of styrene-butadiene rubber (manufactured by JSR Corporation) serving as a binding agent was added thereto and mixed using a dispersing machine. The resulting mixture (coating material) was applied onto an etched aluminum foil (manufactured by JAPAN CAPACITOR INDUSTRIAL Co., Ltd.) serving as a current collector and dried to obtain a negative electrode. The specific surface area of the $Li_4Ti_5O_{12}$ used was 70 $m^2/g$.

(Production of Lithium Ion Capacitor)

Figure 1:
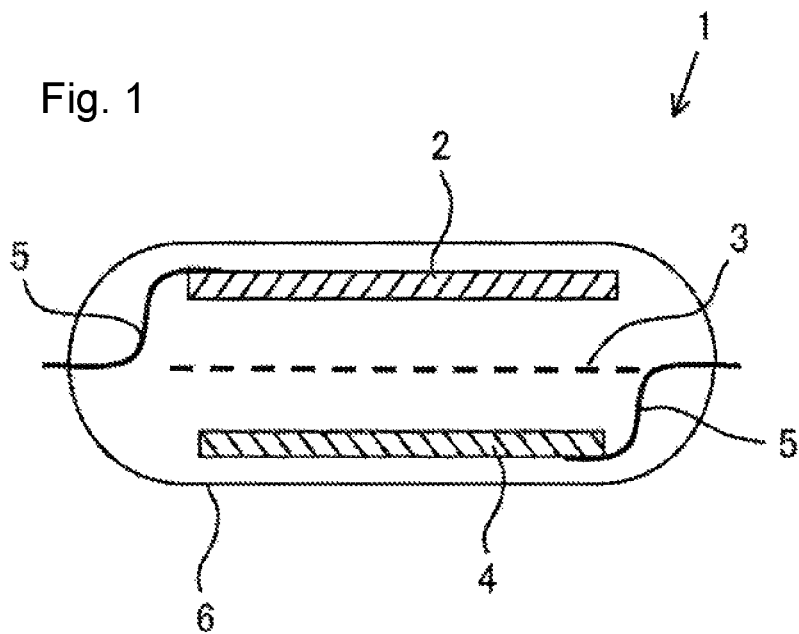
FIG. 1 schematically illustrates a structure of a lithium ion capacitor (lithium ion capacitors in Examples 1 to 11 and Comparative Examples 1, 3, and 4) produced using $Li_4Ti_5O_{12}$ as a negative electrode active material.

The positive electrode and negative electrode produced by the above methods were arranged (stacked) with a separator (manufactured by NIPPON KODOSHI Corporation) disposed therebetween as illustrated in FIG. 1. Subsequently, a 1 M $LiBF_4$/PC (manufactured by KISHIDA CHEMICAL Co., Ltd.) serving as an electrolyte was injected and then sealed to produce a lithium ion capacitor including the lithium ion capacitor positive electrode in Example 1. The electric capacity of the lithium ion capacitor was 600 µAh.

Example 2

A lithium ion capacitor positive electrode in Example 2 was produced in the same manner as in Example 1, except that the content of $Li_2TiO_3$ relative to the positive electrode active material (activated carbon) was changed to 1 wt %. A lithium ion capacitor was produced using the lithium ion capacitor positive electrode.

Example 3

A lithium ion capacitor positive electrode in Example 3 was produced in the same manner as in Example 1, except that the content of $Li_2TiO_3$ relative to the positive electrode active material (activated carbon) was changed to 10 wt %. A lithium ion capacitor was produced using the lithium ion capacitor positive electrode.

Example 4

A lithium ion capacitor positive electrode in Example 4 was produced in the same manner as in Example 1, except that the content of $Li_2TiO_3$ relative to the positive electrode active material (activated carbon) was changed to 20 wt %. A lithium ion capacitor was produced using the lithium ion capacitor positive electrode.

Example 5

A lithium ion capacitor positive electrode in Example 5 was produced in the same manner as in Example 1, except that the content of $Li_2TiO_3$ relative to the positive electrode active material (activated carbon) was changed to 30 wt %. A lithium ion capacitor was produced using the lithium ion capacitor positive electrode.

Example 6

A lithium ion capacitor positive electrode in Example 6 was produced in the same manner as in Example 1, except that the content of $Li_2TiO_3$ relative to the positive electrode active material (activated carbon) was changed to 50 wt %. A lithium ion capacitor was produced using the lithium ion capacitor positive electrode.

Example 7

First, 520 g of an orthotitanic acid (manufactured by TAYCA Corporation) and 218 g of lithium hydroxide monohydrate (manufactured by FMC) were mixed with each other in a wet process. Then, the resulting mixture was fired in the air at 700° C. for 2 hours to obtain fine particles of $Li_4Ti_5O_{12}$ having a specific surface area of 50 $m^2/g$.

Subsequently, a lithium ion capacitor positive electrode in Example 7 was produced in the same manner as in Example 4. On the other hand, the negative electrode active material was changed to the $Li_4Ti_5O_{12}$ having a specific surface area of 50 $m^2/g$. A lithium ion capacitor was produced using the lithium ion capacitor positive electrode and the negative electrode.

Example 8

First, 520 g of an orthotitanic acid (manufactured by TAYCA Corporation) and 218 g of lithium hydroxide monohydrate (manufactured by FMC) were mixed with each other in a wet process. Then, the resulting mixture was fired in the air at 550° C. for 2 hours to obtain fine particles of $Li_4Ti_5O_{12}$ having a specific surface area of 100 $m^2/g$.

Subsequently, a lithium ion capacitor positive electrode in Example 8 was produced in the same manner as in Example 4. On the other hand, the negative electrode active material was changed to the $Li_4Ti_5O_{12}$ having a specific surface area of 100 $m^2/g$. A lithium ion capacitor was produced using the lithium ion capacitor positive electrode and the negative electrode.

Example 9

First, 300 g of an anatase titanium oxide (AMT-100 manufactured by TAYCA Corporation) and 128 g of lithium hydroxide (manufactured by FMC) were mixed with each other in a wet process. Then, the resulting mixture was fired in the air at 825° C. for 2 hours to obtain a 4512-type lithium titanate ($Li_4Ti_5O_{12}$).

Subsequently, a lithium ion capacitor positive electrode in Example 9 was produced in the same manner as in Example 4, except that the $Li_4Ti_5O_{12}$ was used instead of the $Li_2TiO_3$. A lithium ion capacitor was produced using the lithium ion capacitor positive electrode.

Example 10

First, 300 g of an anatase titanium oxide (AMT-100 manufactured by TAYCA Corporation) and 399 g of sodium hydroxide (manufactured by Sigma-Aldrich) were mixed with each other in a wet process. Then, the resulting mixture was fired in the air at 750° C. for 2 hours to obtain a 213-type sodium titanate ($Na_2TiO_3$).

Subsequently, a lithium ion capacitor positive electrode in Example 10 was produced in the same manner as in Example 4, except that the $Na_2TiO_3$ was used instead of the $Li_2TiO_3$. A lithium ion capacitor was produced using the lithium ion capacitor positive electrode.

Example 11

First, 300 g of an anatase titanium oxide (AMT-100 manufactured by TAYCA Corporation) and 249 g of potassium hydroxide (manufactured by Sigma-Aldrich) were mixed with each other in a wet process. Then, the resulting mixture was fired in the air at 750° C. for 2 hours to obtain a 225-type potassium titanate ($K_2Ti_2O_5$).

Subsequently, a lithium ion capacitor positive electrode in Example 11 was produced in the same manner as in Example 4, except that the $K_2Ti_2O_5$ was used instead of the $Li_2TiO_3$. A lithium ion capacitor was produced using the lithium ion capacitor positive electrode.

Example 12

(Production of Positive Electrode)

A lithium ion capacitor positive electrode in Example 12 was produced in the same manner as in Example 1, except that the content of $Li_2TiO_3$ relative to the positive electrode active material (activated carbon) was changed to 10 wt %.

(Production of Negative Electrode)

To 12.47 g of a 1.4 wt % aqueous solution of carboxymethyl cellulose (manufactured by DKS Co., Ltd.) serving as a thickener, 4.62 g of natural graphite (manufactured by Nippon Graphite Industries Co., Ltd.) serving as a negative electrode active material and 0.54 g of acetylene black (DENKA BLACK manufactured by Denka Company Limited) serving as a conductive aid were added, and dispersed using a dispersing machine. Furthermore, 1.37 g of styrene-butadiene rubber (manufactured by JSR Corporation) serving as a binding agent was added thereto and mixed using a dispersing machine. The resulting mixture (coating material) was applied onto a copper foil (manufactured by Fukuda Metal Foil & Powder Co., Ltd.) serving as a current collector and dried to obtain a negative electrode. The specific surface area of the natural graphite used was 4 $m^2/g$.

(Production of Lithium Ion Capacitor)

Figure 2:
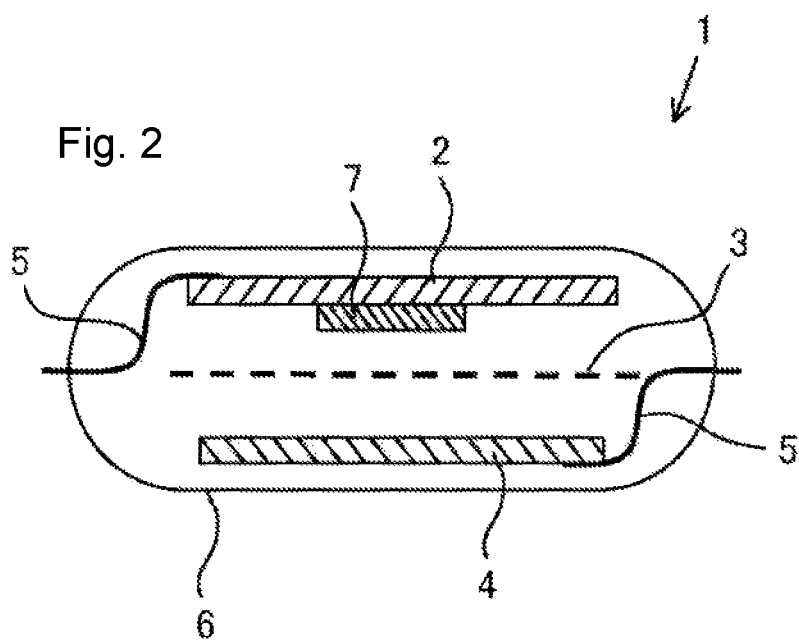
FIG. 2 schematically illustrates a structure of a lithium ion capacitor (lithium ion capacitors in Examples 12 and 13 and Comparative Example 2) produced using graphite as a negative electrode active material.

The positive electrode and negative electrode produced by the above methods and 1.5 mg of a Li metal piece (manufactured by Honjo Metal Co., Ltd.) were arranged (stacked) with a separator (manufactured by NIPPON KODOSHI Corporation) disposed between the positive electrode and the negative electrode as illustrated in FIG. 2. Subsequently, a 1 M $LiPF_6$/EC:DEC=1:2 (manufactured by KISHIDA CHEMICAL Co., Ltd.) serving as an electrolyte was injected, then sealed, and left to stand for 10 days to produce a lithium ion capacitor including the lithium ion capacitor positive electrode in Example 12. The electric capacity of the lithium ion capacitor was 600 μAh.

Example 13

A lithium ion capacitor positive electrode in Example 13 was produced in the same manner as in Example 12, except that the content of $Li_2TiO_3$ relative to the positive electrode active material (activated carbon) was changed to 20 wt %. A lithium ion capacitor was produced using the lithium ion capacitor positive electrode.

Comparative Example 1

A lithium ion capacitor positive electrode in Comparative Example 1 was produced in the same manner as in Example 1, except that the $Li_2TiO_3$ was not added to the positive electrode. A lithium ion capacitor was produced using the lithium ion capacitor positive electrode.

Comparative Example 2

A lithium ion capacitor positive electrode in Comparative Example 2 was produced in the same manner as in Example 12, except that the $Li_2TiO_3$ was not added to the positive electrode. A lithium ion capacitor was produced using the lithium ion capacitor positive electrode.

Comparative Example 3

A lithium ion capacitor positive electrode in Comparative Example 3 was produced in the same manner as in Example 4, except that $TiO_2$ (JA-1 manufactured by TAYCA Corporation) was used instead of the $Li_2TiO_3$. A lithium ion capacitor was produced using the lithium ion capacitor positive electrode. Note that $TiO_2$ does not have electrical conductivity like $Li_2TiO_3$, for example.

Comparative Example 4

A lithium ion capacitor positive electrode in Comparative Example 4 was produced in the same manner as in Example 4, except that $Al_2O_3$ (manufactured by Sigma-Aldrich) was used instead of the $Li_2TiO_3$. A lithium ion capacitor was produced using the lithium ion capacitor positive electrode. Note that $Al_2O_3$ does not have electrical conductivity like $Li_2TiO_3$, for example.

Next, the battery characteristics (rate characteristics) and the effect of suppressing generation of gas were evaluated for each of the produced lithium ion capacitors.

(Evaluation of Rate Characteristics (Rapid Charge/Discharge Characteristics))

Each of the produced lithium ion capacitors was charged and discharged at charge/discharge rates of 1 C and 300 C at 25° C. in the voltage range of 1.5 to 2.8 V. Then, the rate characteristics (rapid charge/discharge characteristics) were evaluated on the basis of calculation formula below.

Discharge capacity at 300 C/Discharge capacity at 1 C×100=Rate characteristics (%)

(Measurement of Amount of Gas Generated)

First, the initial volume of each of the produced lithium ion capacitors in Examples 1 to 13 and Comparative Examples 1 to 4 was measured on the basis of the Archimedes' principle. Specifically, each lithium ion capacitor was sunk in a water tank filled with water at 25° C., and the initial volume of each lithium ion capacitor was calculated from the weight change.

Subsequently, three cycles of charge and discharge were performed on each lithium ion capacitor at a charge/discharge rate of 0.5 C at 60° C. in the voltage range of 1.5 to 2.9 V. Then, the volume of each lithium ion capacitor after charge and discharge was calculated by the same method as above. The volume change of each lithium ion capacitor before and after charge and discharge was determined from the difference from the initial volume to measure the amount of gas generated from each lithium ion capacitor. The percentage of the volume change of each lithium ion capacitor was also determined from calculation formula below.

Percentage of volume change (%)=Volume change (ml)/Initial volume (ml)×100

Table 1 illustrates the results. The results show that the lithium ion capacitors including the lithium ion capacitor positive electrodes in Examples had better rate characteristics (rapid charge/discharge characteristics) than the lithium ion capacitors including the lithium ion capacitor positive electrodes in Comparative Examples.

The results also show that, in addition to the rate characteristics, the lithium ion capacitors including the lithium ion capacitor positive electrodes in Examples had higher electric capacity than the lithium ion capacitors including the lithium ion capacitor positive electrodes in Comparative Examples. Herein, since $Li_2TiO_3$, $Li_4Ti_5O_{12}$, $Na_2TiO_3$, and $K_2Ti_2O_5$ themselves do not contribute to charge and discharge, this finding also overturns the common general technical knowledge in the related art.

The results also show that the lithium ion capacitors including the lithium ion capacitor positive electrodes in Examples had a smaller amount (absolute quantity) of gas generated and a smaller percentage of volume change (more specifically, a percentage of volume change of 5% or less) than the lithium ion capacitors including the lithium ion capacitor positive electrodes in Comparative Examples.

TABLE 1

| | Type of titanate | Content of titanate relative to positive electrode active material (wt %) | Type of negative electrode active material | Specific surface area of negative electrode active material (m²/g) | Rate characteristics (rapid charge/discharge characteristics, %) | Electric capacity of lithium ion capacitor (μAh) | Initial volume of lithium ion capacitor (ml) | Volume change of lithium ion capacitor (ml) | Percentage of volume change of lithium ion capacitor (%) |
|---|---|---|---|---|---|---|---|---|---|
| Example 1 | $Li_2TiO_3$ | 0.5 | $Li_4Ti_5O_{12}$ | 70 | 40 | 600 | 2.23 | 0.10 | 4.5 |
| Example 2 | $Li_2TiO_3$ | 1 | $Li_4Ti_5O_{12}$ | 70 | 42 | 613 | 2.24 | 0.06 | 2.7 |
| Example 3 | $Li_2TiO_3$ | 10 | $Li_4Ti_5O_{12}$ | 70 | 56 | 748 | 2.32 | 0.02 | 0.9 |
| Example 4 | $Li_2TiO_3$ | 20 | $Li_4Ti_5O_{12}$ | 70 | 61 | 893 | 2.34 | 0.01 | 0.4 |
| Example 5 | $Li_2TiO_3$ | 30 | $Li_4Ti_5O_{12}$ | 70 | 66 | 1042 | 2.32 | 0.03 | 1.3 |
| Example 6 | $Li_2TiO_3$ | 50 | $Li_4Ti_5O_{12}$ | 70 | 71 | 1349 | 2.32 | 0.09 | 3.9 |
| Example 7 | $Li_2TiO_3$ | 20 | $Li_4Ti_5O_{12}$ | 50 | 50 | 881 | 2.36 | 0.01 | 0.2 |
| Example 8 | $Li_2TiO_3$ | 20 | $Li_4Ti_5O_{12}$ | 100 | 78 | 903 | 2.37 | 0.04 | 1.7 |
| Example 9 | $Li_4Ti_5O_{12}$ | 20 | $Li_4Ti_5O_{12}$ | 70 | 65 | 814 | 2.34 | 0.03 | 1.3 |
| Example 10 | $Na_2TiO_3$ | 20 | $Li_4Ti_5O_{12}$ | 70 | 69 | 641 | 2.35 | 0.01 | 0.2 |
| Example 11 | $K_2Ti_2O_5$ | 20 | $Li_4Ti_5O_{12}$ | 70 | 69 | 706 | 2.35 | 0.01 | 0.4 |
| Example 12 | $Li_2TiO_3$ | 10 | graphite | 4 | 70 | 1420 | 2.37 | 0.09 | 3.8 |
| Example 13 | $Li_2TiO_3$ | 20 | graphite | 4 | 76 | 1700 | 2.39 | 0.05 | 2.1 |
| Comparative Example 1 | Blank | 0 | $Li_4Ti_5O_{12}$ | 70 | 30 | 586 | 2.22 | 0.15 | 6.7 |
| Comparative Example 2 | Blank | 0 | graphite | 4 | 53 | 593 | 2.38 | 0.20 | 8.4 |
| Comparative Example 3 | $TiO_2$ | 20 | $Li_4Ti_5O_{12}$ | 70 | 12 | 485 | 2.31 | 0.15 | 6.5 |
| Comparative Example 4 | $Al_2O_3$ | 20 | $Li_4Ti_5O_{12}$ | 70 | 15 | 477 | 2.32 | 0.15 | 6.5 |

It has been found from the above results that, according to the lithium ion capacitor positive electrode of the present invention, when the positive electrode of a lithium ion capacitor contains a particular titanate as an additive, the rate characteristics of the lithium ion capacitor can be improved despite the fact that the titanate itself has no electrical conductivity.

It has also been found that, in the lithium ion capacitor positive electrode according to the present invention, the generation of various gases such as carbonic acid gas, hydrogen gas, and fluorine gas during operation or due to time-varying changes can be suppressed while the rate characteristics are improved.

INDUSTRIAL APPLICABILITY

The lithium ion capacitor positive electrode according to the present invention is applicable to lithium ion capacitors.

REFERENCE SIGNS LIST 1 lithium ion capacitor
2 positive electrode (containing at least one titanate selected from $Li_2TiO_3$, $Li_4Ti_5O_{12}$, $Na_2TiO_3$, and $K_2Ti_2O_5$)
3 separator
4 negative electrode
5 tab lead
6 case
7 Li metal piece

The invention claimed is:

1. A lithium ion capacitor comprising:
   a negative electrode comprising at least one of graphite and $Li_4Ti_5O_{12}$; and
   a positive electrode comprising a mixture comprising:
      a positive electrode active material; and
      at least one titanate selected from the group consisting of $Li_2TiO_3$, $Li_4Ti_5O_{12}$, $Na_2TiO_3$, and $K_2Ti_2O_5$ in an amount of 1 to 30 wt % relative to the positive electrode active material.

2. The lithium ion capacitor according to claim 1, wherein a volume change of the lithium ion capacitor is 0.2 to 4.5%.

3. The lithium ion capacitor according to claim 2, wherein the lithium ion capacitor has a rate characteristics of 40 to 78% and an electric capacity of 600 to 1700 μAh.

4. The lithium ion capacitor according to claim 2, wherein the lithium ion capacitor has a rate characteristics of 40 to 78%.

* * * * *